Oct. 23, 1956     P. E. PONTIUS     2,767,681
INDICATING MEANS

Filed May 4, 1953     2 Sheets-Sheet 1

INVENTOR.

PAUL E. PONTIUS

By Charles L. Lovercheck
Attorney

Oct. 23, 1956  P. E. PONTIUS  2,767,681
INDICATING MEANS
Filed May 4, 1953  2 Sheets-Sheet 2

INVENTOR.
PAUL E. PONTIUS

United States Patent Office 2,767,681
Patented Oct. 23, 1956

2,767,681

INDICATING MEANS

Paul E. Pontius, Erie, Pa., assignor to J. A. Zurn Mfg. Co., Erie, Pa., a corporation of Pennsylvania Application May 4, 1953, Serial No. 352,898

5 Claims. (Cl. 116—125)

This invention relates generally to indicating means for valves.

In the operation of remotely controlled valves and similarly remotely controlled apparatus controlled by the rotation of a shaft or stem where more than one revolution of the controlling stem is required to completely open the valve or operate the device, it is desirable to have some means of indicating the exact position of the valve at a given rotation of the stem so that it can be determined at a glance whether or not the valve or device is partially or completely open. When no indicating means is provided to indicate the position of the valve or device, it is necessary for the operator to know the total number of turns necessary to completely open the valve and then count the number of turns he has rotated the valve stem and, from this, estimate what percentage of the total open position the valve is in.

It is, accordingly, an object of my invention to overcome the above and other problems in previous remotely controlled devices by providing an indicating means which will enable the operator to tell at a glance the position of the closing means in a valve where more than one rotation of the stem is required to completely open the valve.

Another object of my invention is to provide an indicating means for a valve stem operated by a differential gear train wherein the relative movement of a pointer on a dial driven by a differential gear indicates the proportionate axial movement of the stem.

Another object of my invention is to provide an indicating means which is simple in construction, efficient in operation, and economical to manufacture.

With the above and other objects in view, the present invention consists of the combination and arrangement of parts hereinafter more fully described, illustrated in the accompanying drawing, and more particularly pointed out in the appended claims, it being understood that changes may be made in the form, size, proportions, and minor details of construction without departing from the spirit or sacrificing any of the advantages of the invention.

Figures 1, 2:
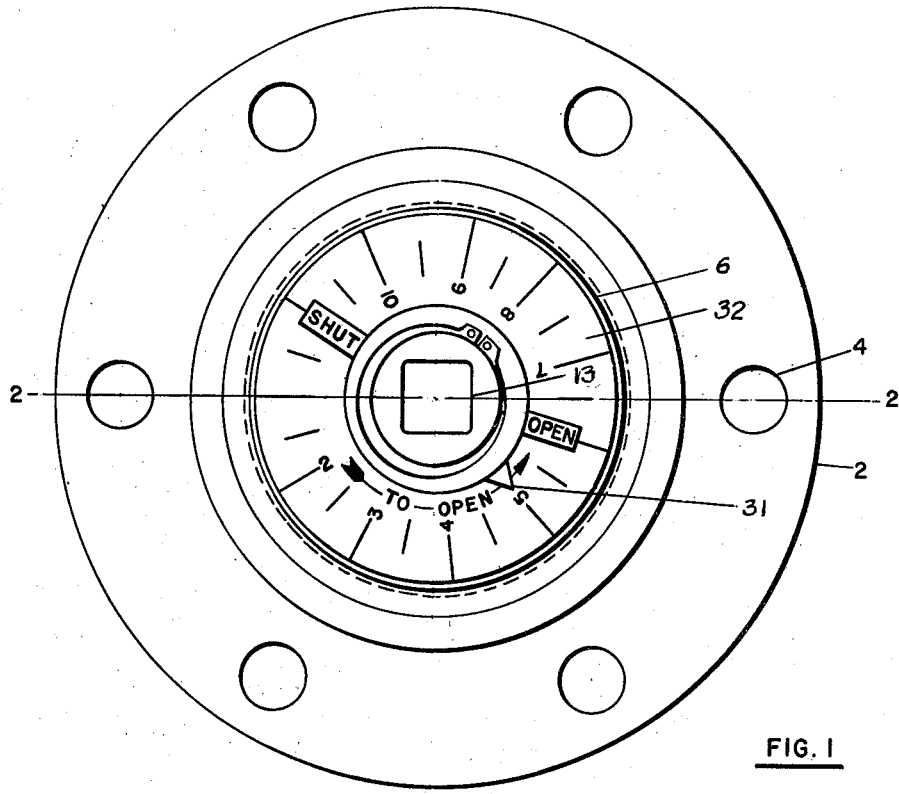
Fig. 1 shows a top view of my novel access box with the cover removed.
Fig. 2 shows a cross sectional view taken on line 2—2 of Fig. 1.
Figure 3:
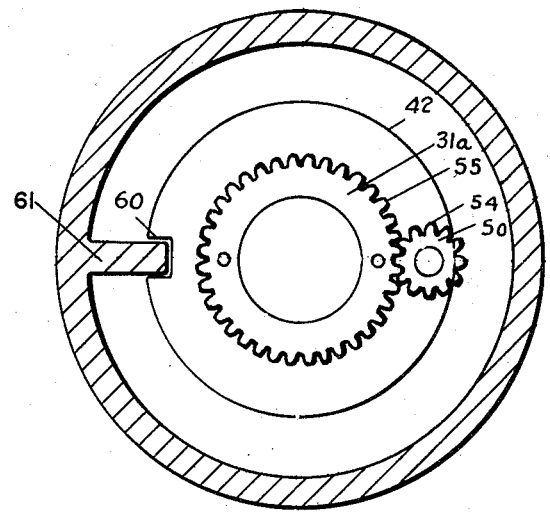
Fig. 3 shows a cross sectional view taken on line 3—3 of Fig. 2.

Now with more specific reference to the drawing, the access box 1 has the flange 2 integrally connected thereto at 3 and has the spaced holes 4 formed therein for attaching the flange 2 to a supporting means. An inwardly extending shoulder 5 is provided adjacent the upper edge of the access box 1 and the shoulder 5 is threaded at 6 to receive the cover 7 which is threaded at 8 to engage the threads 6 of the shoulder 5. A tapered surface 9 is formed on the upwardly extending rim of the access box 1 to mate with the complementary tapered surface 10 on the access box cover 7. A square wrench receiving recess 12 is provided in the cover of the access box to receive a wrench to rotate the cover in order to remove it for inspection of the access box. A similar aperture 13 is provided in the upper end of the stem or shaft 14 to receive the square end of a wrench or crank for rotating the stem 14 in order to operate the valve. The lower end 15 of the stem 14 is adapted to be attached to a valve or a similar device which is to be operated.

A washer 16 is concentrically disposed on the shaft 14 and is held against longitudinal sliding on the stem 14 by means of taper pin 17 which is received in complementary shaped hole 18 in the washer 16 and in hole 19 in the stem 14. The lower edge 20 of the boss 21 is machined to slidably engage the washer 16 and the upper edge 22 of the boss 21 is machined to slidably engage the lower surface of the flange 23. A circumferential groove 24 is formed in the shaft 14 to receive an O-shaped ring 25 to form a seal against flow of liquid between the stem 14 and the inner surface 20 of the boss 21.

The indicator needle 31 is supported on the ring 34 which is keyed at 35 to rotate with the stem 14 and a washer 36 is disposed in a groove 37 in the stem 14 to hold the member 34 from moving off the stem 14. The indicator plate or dial 32 is fixed to rotate with the upper gear 31a and the upper gear 31a is journalled to rotate freely on stem 14 at 33.

The stem 14 has the integral flange 23 attached thereto and the lower gear 38 has holes 39 formed therein which receive pins 40. Pins 40 extend into holes 41 in the flange 23 to hold the lower gear 38 to the flange 23 and cause the gear 38 to rotate with the stem 14. A plate 42 is journalled on the stem 14 at 44 and at a bore 45 which rotatably receives the enlarged portion 46 of the shaft 47 which is disposed at one side of the plate.

The lower spur gear 48 is attached to the reduced size end 49 of the shaft 47 and is held thereon against rotation and the upper spur gear 50 is attached to the reduced size end 51 of the shaft 47 and is held thereon against rotation by a key, pin, or other fastening means. The spur gear 48 has teeth 52 which engage teeth 53 on the lower gear 38 and the spur gear 50 has teeth 54 which engage the teeth 55 on the upper gear 31a. The upper gear 31a is fixed by means of the pins 59 to rotate with the plate 32. The plate 42 has the recess 60 which is adapted to receive the projection 61 which is integrally attached to the access box at 63 and which holds the plate 42 against rotation. The access box has the inwardly extending flange 65 and it will be noted that the dial 32 projects over the edge of the flange 65 to prevent dirt and other foreign material from falling down into the access box.

The lower spur gear 48 preferably has a larger number of teeth on it than the upper spur gear 50. This will cause a relative movement between the indicator needle 31 which is fixed to the stem 14 to rotate with the stem and the indicating plate 32 which is fixed to rotate with the upper gear 31a.

Additional depth of the access box at 63a is provided so that additional differential gear trains can be provided if it is desired to obtain an additional ratio between the relative movement of the indicator and the dial. The end 15 of the stem 14 can be attached to the end of the flexible shaft or other suitable operating means to operate a machine or device.

It will be apparent that as long as the ratio of the teeth on the lower spur gear to the number on the lower gear is different from the ratio of the number of teeth on the upper spur gear to the number of teeth on the upper gear 31a, there will be a relative movement between the pointer 31 and the dial 32. By adjusting the said ratio of the teeth on the respective gears, the dial can be calibrated so that the indicator plate 32 will indicate the position of the stem 14 in its axial movement over a given distance of the dial.

Figure 4:
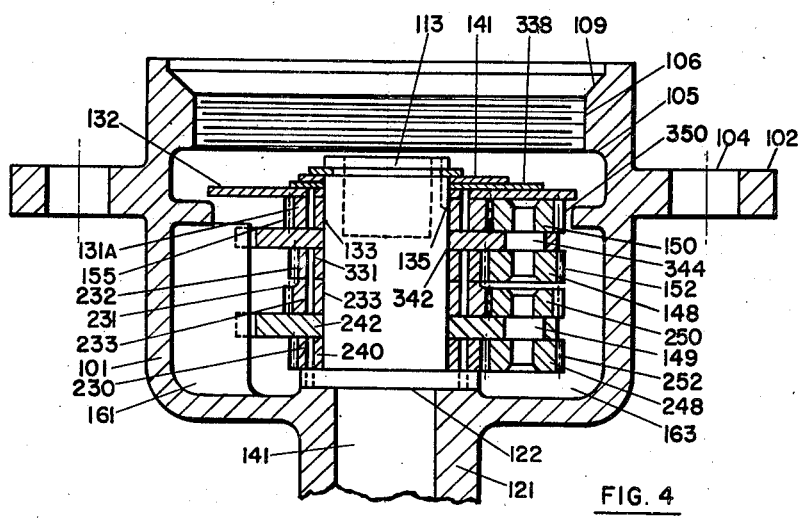
Fig 4 shows a cross sectional view of another embodiment of my invention.

In Fig. 4, I show another embodiment of my invention wherein a shaft 114 is disposed in the access box 101 in a similar manner to the corresponding members in the embodiment shown in Fig. 2. A cylindrical flange 123 is integrally attached to the shaft 114 and the lower gear 238 is pinned thereto by pins 240. A washer 242 is held against rotation by the projection 161 which is integrally attached to the access box. The spur gears 250 and 248 are pivotally held to the washer 242 by means of the shaft 149 and restrained to pivot around a common axis. Spur gear 248 has teeth 252 which engage corresponding teeth on the gear 238 and spur gear 250 has teeth which engage corresponding teeth on intermediate gear 231. Intermediate gear 231 is pinned to rotate with gear 232 by means of pins 233. Upper intermediate gear 331 has teeth thereon which engage the spur gear 148 and spur gear 148 is journalled on shaft 344 which has upper spur gear 150 journalled thereon and which is rotatably held in the upper washer 342. The upper washer 342 is held in this rotation by means of the projection 161. Spur gear 150 has teeth 350 which engage teeth 155 on upper gear 131A. The dial 132 is pinned to rotate with the upper gear 131A by means of the pins 338 and shaft 114 has indicator 141 attached thereto. By controlling the ratio of the number of teeth on the lowermost gear to the number of teeth on the lower intermediate gear and controlling the ratio of the number of teeth on the upper intermediate gear to the number of teeth on the uppermost gear, it will be obvious that a multiplication of relative movement of the pointer with regard to the dial can be accomplished in this design of the invention.

In the foregoing specification, I have set forth the invention in its preferred practical forms but I am aware that the structure shown is capable of modification within a range of equivalents without departing from the invention which is to be understood is broadly novel as is commensurate with the appended claims.

What I claim is:

1. An indicating means for indicating the longitudinal position of an axially movable member moved longitudinally by rotation thereof comprising a stem, means to operatively attach said stem to said member, an indicating plate having a scale thereon journalled on said stem, a pointer attached to the stem to rotate therewith, and a differential gear train connected between the indicating plate and said stem to rotate the indicating plate relative to the pointer, said indicating plate being calibrated in parts of the entire axial movement of the stem and said pointer adapted to move over said calibrations.

2. An indicating means for indicating the longitudinal position of an axially movable member operated by a rotating stem comprising a stem, an indicating plate journalled on said stem, a pointer attached to the stem to rotate therewith over said plate, and a differential gear train operably connecting said plate to said stem, said gear train comprising a first gear attached to said plate and disposed concentric to said stem, a second gear disposed concentric to said stem and fixed to rotate therewith, a spur gear operatively engaging said first gear, a second spur gear fixed to rotate on a common axis with said first spur gear, said second spur gear having a larger number of teeth than said first spur gear, and means to support said spur gears in operative position relative to said plate.

3. An indicating means for indicating the longitudinal position of an axially movable member operated by a rotating stem comprising a rotatable stem, means to operatively attach an indicating plate journalled on said stem, a pointer attached to the stem to rotate therewith, and a differenial gear train, said gear train comprising a first gear attached to said plate and disposed concentric to said stem, a second gear disposed concentric to said stem and fixed to rotate therewith, a spur gear operatively engaging said first gear, and a second spur gear fixed to said first spur gear to rotate on a common axis therewith said spur gears having means to support them relative to said first and second gears, said first gear having a larger number of teeth than said second gear, said means to support said spur gears comprising axles supporting said spur gears carried by a plate, said plate being journalled on said stem.

4. An indicating means comprising a stem, a pointer fixed to rotate with said stem, a first gear concentrically disposed on said stem, an indicating plate attached to said gear and rotatable on said stem, a second gear concentrically disposed on said stem and fixed to rotate therewith, a first spur gear engaging said first gear, a second spur gear restrained to rotate on a common axis with said first spur gear, said second spur gear operatively engaging said second gear, and means to support said spur gears, said first spur gear having a greater number of teeth than said second spur gear.

5. An indicating means comprising a stem, a pointer fixed to rotate with said stem, a first gear concentrically disposed on said stem and rotatable thereon, an indicating plate attached to said gear, a second gear concentrically disposed on said stem and fixed to rotate therewith, a first spur gear engaging said first gear, a second spur gear rotatable on a common axis with said first spur gear, said second spur gear operatively engaging said second gear, and means to support said spur gears, said indicating means disposed in a cup shaped member, an inwardly directed flange attached to said cup shaped member, and said indicating plate overlapping said flange.

References Cited in the file of this patent

UNITED STATES PATENTS

| | | |
|---|---|---|
| 1,235,767 | Clark | Aug. 7, 1917 |
| 1,778,583 | Bryant | Oct. 14, 1930 |